T. SPENCER.
SECONDARY BATTERY.
APPLICATION FILED JULY 24, 1918.
1,377,227.
Patented May 10, 1921.
2 SHEETS—SHEET 1.
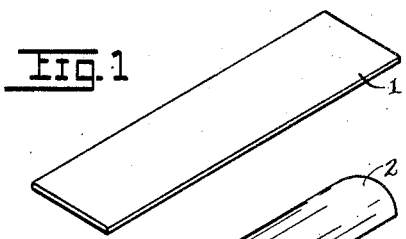
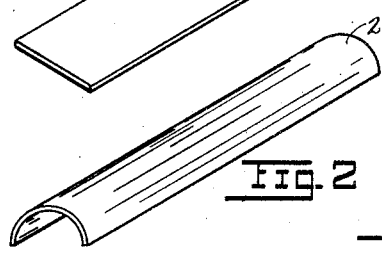
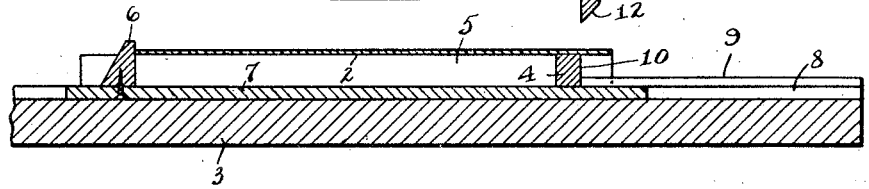
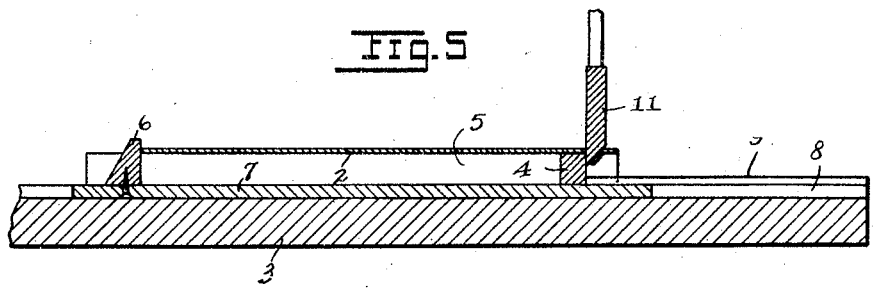
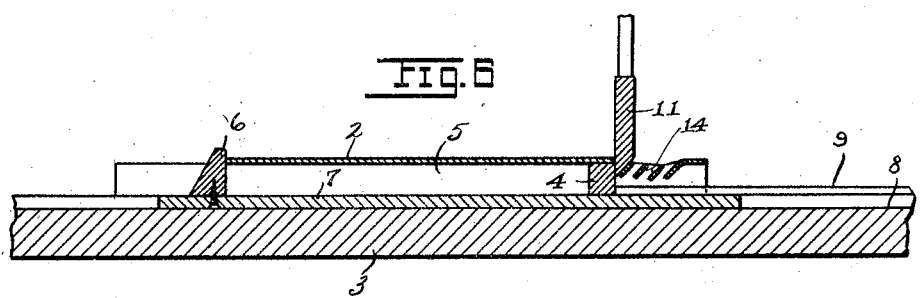
*INVENTOR.*
THOMAS SPENCER
BY Ira J. Adams.
*ATTORNEY*

T. SPENCER.
SECONDARY BATTERY.
APPLICATION FILED JULY 24, 1918.
1,377,227.
Patented May 10, 1921.
2 SHEETS—SHEET 2.
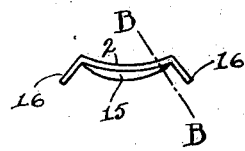
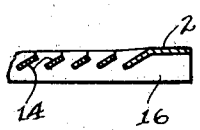
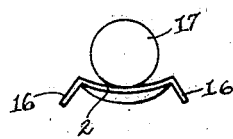
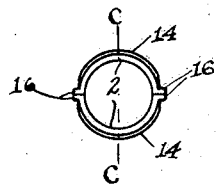
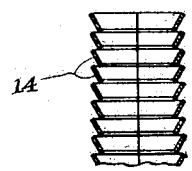
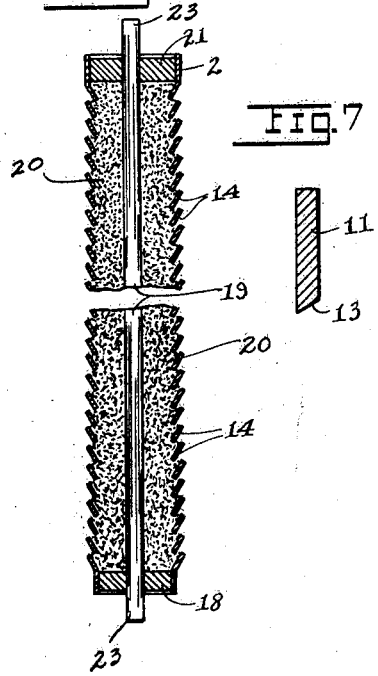
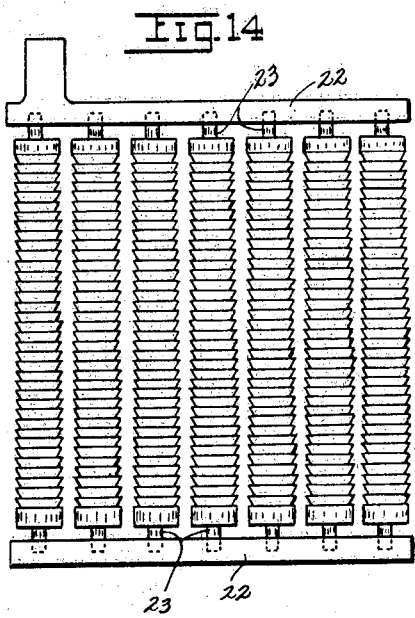
INVENTOR.
THOMAS SPENCER
BY Ira J. Adams
ATTORNEY

UNITED STATES PATENT OFFICE.

THOMAS SPENCER, OF LAKEWOOD, OHIO, ASSIGNOR TO NATIONAL CARBON COMPANY, INC., A CORPORATION OF NEW YORK.

SECONDARY BATTERY.

1,377,227. Specification of Letters Patent. Patented May 10, 1921.

Application filed July 24, 1918. Serial No. 246,433.

*To all whom it may concern:*

Be it known that I, THOMAS SPENCER, a citizen of the United States, residing at Lakewood, in the county of Cuyahoga and State of Ohio, have invented a certain new and useful Improvement in Secondary Batteries, of which the following is a full, clear, and exact description.

This invention relates to storage batteries and particularly to positive electrodes having the active material inclosed in a casing.

The principal advantage of a positive electrode of this type over some of the more successful ordinary pasted type is its longer life. The commercial batteries of this type at present use small hollow rubber tubes for the lead peroxid and provide the tubes with a large number of exceedingly fine slots which render the tube permeable to the electrolyte. On account of the cost of the high grade rubber required for the tubes and the difficulty of making the slits, this type of battery has heretofore been considerably more expensive than other types.

The object of the present invention is to provide a construction which does not require the use of rubber tubes.

Another object is to construct an element adapted to retain the active material in a manner that will tend to decrease the washing effect which occurs in batteries due to the upward motion of the gases and electrolyte during the process of charging.

Other objects will appear in the following description and appended drawings in which:

Figure 1 is a view of one of the flat sheets of material from which the casings are made.

Fig. 2 shows the sheet bent in a semicircular shape before slotting.

Fig. 3 is a diagrammatic sectional view illustrating the manner of slotting the sheet.

Fig. 4 is an end view of the elements shown in Fig. 3.

Fig. 5 is a view similar to Fig. 3, showing the manner in which the lead is displaced by the cutting edge.

Fig. 6 shows the lead sheet after several cuts have been made.

Fig. 7 is a section on the line A—A of the cutter shown in Fig. 4.

Fig. 8 is an enlarged end view of a sheet after cutting.

Fig. 9 is a fragmentary section on the line B—B of Fig. 8.

Fig. 10 indicates the manner of bending the cut sheet of Fig. 8 into a semicircular shape.

Fig. 11 is an enlarged end view of two semicircular pieces trimmed and joined at the edges.

Fig. 12 is a cross section on the line C—C of Fig. 11.

Fig. 13 is an enlarged cross section of a tube after filling with active material.

Fig. 14 shows a number of tubes fitted together to form a positive storage battery plate.

The present invention consists in the formation of a tube from two sheets of antimonious lead, the antimony content of which may vary from 4 to 20%. The flat sheets 1 as shown in Fig. 1 are bent into approximately semicircular shape 2, as in Fig. 2. These strips will then be slitted or cut in any suitable press provided with suitable mechanism, such as that illustrated diagrammatically in Fig. 3. The bed 3 of the press has fitted thereto a semicylindrical member 4 provided with a slot 5, adapted to receive an upstanding lug 6 having a strip 7 attached thereto movable in a guide 8 of the bed. The member 4 is shaped to fit the curved sheet 2 which is slidable on the member 4, the edges fitting in grooves formed by means of upstanding lugs 9. When fitted on the curved member one end will be placed against the lug 6 and the other end will project over the edge 10 of the curved member. Any suitable well known means (not shown) is provided for moving the lug 6 forward step by step to move the curved sheet 2 therewith. At each movement of the sheet over the edge 10 a cut is made by means of a reciprocating blade 11. It will be understood that the lug 6 will be stationary during the cutting. The cuts are made close together, preferably about 30 to 60 to the inch.

To arrange the metal depressed by the blade in a manner which will ultimately assume positions which will be further described, a specially shaped blade is used. The cutting edge 12 may be described as a portion of the surface of a truncated cone. As appears in Figs. 3, 5 and 6, at the central point the inclination of the cutting edge 12 is about 45° with a horizontal line drawn through the point, but as the outer edges of the tool are approached, lines similarly drawn will make smaller angles with the cutting edge of the tool. At the point 13 for example, the angle is about 30° as shown in Fig. 7.

These angles may be varied more or less depending on the thickness of the sheet metal used, but in any case it is desirable to have the slope greater at the point than at the edges. The thickness of the blade at the base is sufficient to maintain the sheet metal ribs 14 against the cutting edge during the cutting stroke which causes them to assume the same angle as the blade.

The form of the completed strip is shown in Fig. 8, in which it will appear that the central end portion 15 is depressed, the curve being slightly in the opposite direction from the original curvature in the center. Two edges 16, 16, which are at an angular relation to the center 15 are thus formed.

In the section shown in Fig. 9 the angular position of the cut strips is shown on the line B, B of Fig. 8, and compared with the angular position of the strips of Fig. 6 there is an angular difference produced by the peculiar cutting edge. The strips are then rounded into a semicircular shape over a rod 17 and the bending action causes the center of the cut strip to be flattened out so that it assumes practically the same angular relation as the strips indicated in Fig. 9 and the spacing is uniform. If the strips were cut by a flat tool or other tool not adapted to produce the form described, the subsequent bending would move the strips so that the slits would not be uniform and might even be closed up.

The edges 16 are then trimmed off close to the end of the cuts and two members are marginally joined in any appropriate manner such as electric or gas welding or by flanging to form a cylindrical tube. The tube, a portion of which is shown empty in Fig. 12, is then provided with an insulator 18 which is fitted in one end as shown in Fig. 13. A central rod or strip 19 of lead is passed through the insulator and the paste 20 of lead peroxid or material adapted to be formed into lead peroxid upon charging, is tamped or forced around the rod and into the tube. When filled a second insulator 21 is fitted in the upper end to hold the active material. A number of these tubes which are of small diameter ($\frac{5}{16}''$) are fitted at the top and bottom with suitable supports 22, by lead burning to the projecting ends 23 of the rods. This assembly constitutes the positive plate of a secondary battery and is suitable for use with the usual spongy lead plate negative and wood separators used in the Faure battery.

In charging a discharged positive plate constructed in this manner the lead sheath develops almost immediately a counter E. M. F. greater than that of the discharged lead sulfate, so that current passes through the discharged material in the slits to the central rod and then to the frame to form the peroxid. Charging will continue until all the lead sulfate is converted to the peroxid which is a conductor, and then if charging is continued some of the current will pass through the sheath. With a sheath of ordinary pure lead, a forming action tending to convert the sheath into lead peroxid would then occur, which in time would ruin the sheath; but by using a sheath of antimonious lead this action is found to be decreased to such an extent that with ordinary overcharging the sheath is not damaged to any great extent and the plate has long life.

A cross section of the tube shows the strips are inclined so that the openings are directed upward from the inside to the outside of the casing. By this means the washing action of gases and electrolyte escaping through the slits and passing up along the sides of the tubes is decreased because the gases are deflected and the strips form funnel shaped pockets which retain any loose mix instead of allowing it to fall out.

Having described my invention, what I claim is:

1. An electrode member for secondary batteries comprising a tubular casing having transverse slits in its wall, and filling material in said casing exposed at such slits, the portions of said wall between such slits being inclined upwardly and outwardly whereby the washing effect of the upward motion of the gases and electrolyte during charging is diminished.

2. An electrode member for secondary batteries comprising a tubular casing having upwardly and outwardly inclined portions integrally connected at their ends but separated intermediate their ends by upwardly and outwardly extending passages, and filling material in said casing exposed at such passages, such inclined portions protecting such filling material from the washing effect of the upward motion of the gases and electrolyte during charging.

3. An electrode for secondary batteries comprising a plurality of tubular elements mechanically and electrically connected at their upper and lower ends, each of such elements comprising a tubular casing having transverse slits in its wall, and filling material therein, such filling material being exposed at such slits, the portions of the wall of each element between the slits therein being inclined upwardly and outwardly in respect to the general plane of such wall to protect such filling material and thereby diminish the washing effect of the upward motion of the gases and electrolyte during charging.

4. An electrode member for secondary batteries comprising a tubular casing having transverse slits in its wall, a conducting and reinforcing core extending through said casing and beyond the opposite ends thereof, and filling material in said casing surrounding said core and exposed at the slits in the wall of the casing, the portions of such wall between such slits being inclined upwardly and outwardly whereby the washing effect of the upward motion of the gases and electrolyte during charging is diminished.

5. The method of making an electrode member that comprises marginally uniting a plurality of transversely slitted metal plates to form a tube, introducing filling material into such tube, and closing the ends of said tube.

6. The method of making an electrode member that comprises slitting a plurality of suitable metal plates transversely of their length and bending the portions of the plates between such slits to a position inclined with respect to the original surfaces of the plates, bending such transversely slitted plates into concave shape and marginally uniting them along their longitudinal edges to form a tube, inserting a conducting and reinforcing member in said tube and closing one end of the tube, introducing filling material into said tube around said conducting member, and closing the other end of said tube.

7. In secondary batteries, a positive plate having elements attached thereto each consisting of a slitted lead casing having inclined strips therebetween adapted to form openings extending upwardly from the inside to the outside of the casing and connected together by a longitudinal unslotted strip of the casing, a core extending through the center of the casing and a filling of active material between the core and casing.

8. In secondary batteries, a positive plate having elements attached thereto each consisting of a slitted lead casing having inclined ribs therebetween adapted to form openings extending upwardly from the inside to the outside of the casing and connected together by a longitudinal unslotted strip of the casing, a core extending through the center of the casing, a pair of insulators fitted on the core and adapted to close the ends of the casing, and a filling of lead peroxid between the core and casing.

9. In secondary batteries, a positive electrode consisting of a plurality of lead cores, a tube surrounding each of said cores, said tube being made of an alloy of lead and antimony and having a large number of transverse slits therein, said slits having inclined ribs therebetween adapted to form openings extending upwardly from the inside to the outside of the tube, a filling material of lead peroxid within the tube and around the core, a pair of insulating washers adapted to close the ends of the tube and fitted on said core, the ends of the core extending beyond the washers, and a lead frame adapted to receive the ends of the cores.

10. The method of making a tube for retaining the active material of the positive element of a secondary battery, which consists in making incisions in a plate defining a large number of narrow strips joined by uncut portions, deflecting the strips and bending the plate into tubular form about an axis at right angle to the strips.

11. The method of making a tube for retaining the active material of the positive element of a secondary battery, which consists in making in each of a plurality of plates a large number of incisions defining narrow strips and uncut portions, deflecting the strips, bending the plates and joining them to form the tube.

12. The method of manufacturing a tube for retaining the active material of the positive plate of a secondary battery which consists in making a large number of cuts placed close together along the central portion of a metal strip by means of a cutting tool having an edge adapted to incline the ribs between the cuts, bending the strip around a rod to form a semicylindrical member having uncut edges, and joining the edges of two such members to form a slitted tube having inclined ribs.

13. The method of manufacturing a tube for retaining the active material of the positive plate of a secondary battery which consists in making a plurality of cuts close together along the central portion of a semicylindrical lead strip by means of a cutting tool adapted to incline the ribs between the cuts, bending the strip around a rod to form a semicylindrical member having uncut edges, trimming a portion of the edges, joining the edges of two such members by welding to form a slitted tube having inclined ribs.

14. The method of manufacturing a tube for retaining the active material of the positive plate of a secondary battery which consists in making a large number of cuts placed close together along the central portion of a metal strip to form a depressed central cut portion and connecting edges on each side of the central ribbed portion bent at an angle therewith, bending the strip around a rod to form a semicylindrical member having uncut edges, trimming a portion of the edges, joining the edges of two such members by welding to form a slitted tube having spaced ribs.

15. The method of manufacturing a tube for retaining the active material of the positive plate of a secondary battery which consists in making a plurality of cuts close together along the central portion of a semicylindrical lead strip by means of a cutting tool adapted to bend the central portion of the semicylindrical strip to produce ribs having a reverse curvature therein and to provide a pair of uncut edges at an angular relation to the curved central cut portion, bending the central curved portion around a rod to form a semicylindrical member, and joining the edges of two such members to form a slitted tube having inclined ribs.

In testimony whereof, I hereunto affix my signature.

THOMAS SPENCER.